US012704257B2

(12) United States Patent
Tudorache

(10) Patent No.: US 12,704,257 B2
(45) Date of Patent: Aug. 11, 2026

(54) FURNACE FOR IMPLEMENTING AN ENDOTHERMIC PROCESS

(71) Applicant: L'Air Liquide, Société Anonyme pour l'Etude et l'Exploitation des Procédés Georges Claude, Paris (FR)

(72) Inventor: Diana Tudorache, Bures sur Yvette (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 368 days.

(21) Appl. No.: 18/222,755

(22) Filed: Jul. 17, 2023

(65) Prior Publication Data

US 2024/0019122 A1 Jan. 18, 2024

(30) Foreign Application Priority Data

Jul. 18, 2022 (FR) ...................................... 2207335

(51) Int. Cl.
*F23M 9/06* (2006.01)
*B01J 19/24* (2006.01)
*F23D 23/00* (2006.01)
*F23D 99/00* (2010.01)

(52) U.S. Cl.
CPC ............ *F23M 9/06* (2013.01); *B01J 19/2415* (2013.01); *B01J 2219/00157* (2013.01); *F23D 23/00* (2013.01); *F23D 99/004* (2025.08)

(58) Field of Classification Search
CPC ...... F23D 99/004; B01J 19/2415; F23M 9/06; F23C 13/00; F23C 2900/03002
USPC .............. 431/182–184, 8, 178; 422/198, 204
See application file for complete search history.

(56) References Cited

U.S. PATENT DOCUMENTS

| | | | | |
|---|---|---|---|---|
| 1,911,177 | A * | 5/1933 | Beck | F23D 99/004 431/179 |
| 3,348,923 | A | 10/1967 | Demarest | |
| 7,686,611 | B2 | 3/2010 | Joshi et al. | |
| 2007/0128091 | A1 | 6/2007 | Gorval | |
| 2010/0278700 | A1 | 11/2010 | Clawson et al. | |

(Continued)

FOREIGN PATENT DOCUMENTS

| | | |
|---|---|---|
| DE | 1 255 639 | 12/1967 |
| EP | 2 369 229 | 9/2011 |

(Continued)

OTHER PUBLICATIONS

French Search Report for corresponding FR 220335, Feb. 21, 2023.

*Primary Examiner* — Vivek K Shirsat
(74) *Attorney, Agent, or Firm* — Allen E. White; Elwood L. Haynes

(57) ABSTRACT

A furnace for implementing an endothermic process, including a combustion chamber delimited by a wall, at least one tubular reactor positioned in the combustion chamber, at least one burner arranged in the combustion chamber configured to supply the tubular reactor with the heat required for the endothermic process, with the burner including at least one nozzle for discharging a flame, the nozzle being oriented along an axis of the nozzle. Wherein the chamber has, over at least part of an inner surface of the wall, a convex inner profile curved in a direction of the axis of the nozzle, the profile being adjacent to the burner and facing the axis.

4 Claims, 5 Drawing Sheets

(56) References Cited

U.S. PATENT DOCUMENTS

| | | | |
|---|---|---|---|
| 2015/0217250 A1 | 8/2015 | Cances et al. |
| 2015/0239736 A1 | 8/2015 | Martin et al. |
| 2020/0182455 A1 | 6/2020 | Tudorache |

FOREIGN PATENT DOCUMENTS

| | | |
|---|---|---|
| FR | 3 107 337 A3 | 8/2021 |
| WO | WO 2020 035706 | 2/2020 |

* cited by examiner

FURNACE FOR IMPLEMENTING AN ENDOTHERMIC PROCESS

CROSS REFERENCE TO RELATED APPLICATIONS

This application claims the benefit of priority under 35 U.S.C. § 119 (a) and (b) to French Patent Application No. 2207335, filed Jul. 18, 2022, the entire contents of which are incorporated herein by reference.

BACKGROUND

The invention relates to the field of furnaces that are used in endothermic processes such as the cracking of hydrocarbon feedstocks which is implemented in externally heated reactors, in particular furnaces for the steam reforming of hydrocarbons, essentially of methane. The process for the steam reforming of hydrocarbons is known by its acronym SMR, standing for steam methane reforming.

The SMR process is essentially based on the reforming reaction of the methane which, in the presence of steam, results in a mixture comprising mainly hydrogen and carbon monoxide. The slow and endothermic reaction requires a catalyst and a supply of additional heat. In general, the reforming performance is limited not by the kinetics of the reactions but by the transfer of heat.

In practice, an SMR reformer comprises tubular reactors (also called reforming tubes or more simply tubes) which are placed in a furnace, contain the catalyst—often in the form of pellets or granules—and are fed with a gaseous reaction mixture of methane (CH4) and steam.

The most common configurations for reforming furnaces are of the down-fired (roof-fired or top-fired), up-fired (floor-fired or bottom-fired), side-fired or terrace wall-fired type.

Vertically heated furnaces (burners in the crown or in the hearth) typically consist of a combustion chamber most often of rectangular shape which is equipped with a refractory coating and which contains several rows of tubes. The heat required for the reforming is supplied by burners which are themselves placed in rows between the rows of tubes, except for two rows of burners which are placed between a row of tubes and a lateral inner surface of the furnace parallel to the rows of tubes. The burner rows that are adjacent to two rows of tubes are referred to as inner rows—the burners thereof are referred to as inner burners—, each row of inner burners heats the rows of tubes situated on either side thereof. The burner rows that are situated between a row of tubes and the lateral inner surface of the furnace—also referred to as lateral wall or adjacent wall—only heat one row of tubes. The burners of these rows—referred to as outer burners—should therefore have a lower heating power than the inner burners.

The main objective in the design of the furnace and in the use thereof is to maximize the transfer of heat from the burners to the tubes—from flames, but also from the wall of the furnace and hot flue gases—, while still complying with the maximum operating temperature constraint for each tube. The maximum operating temperature (MOT, or DTT standing for design tube temperature) is dependent on several factors, in particular the mechanical load on the tube (essentially the pressure of the feed gas), mechanical properties of the alloys used for the tubes and the service life desired for these tubes which are exposed to the risks of creep and thermal ageing.

Intensifying the heat transferred to the tubes has a direct positive impact, by increasing the productivity and by improving the compactness of the furnace, this being notable in terms of investment and operating costs. However, increasing the heat transferred to the tubes typically means increasing the temperature level of the tubes, therefore either reducing the service life thereof or requiring the use of more resistant alloys which are much more expensive.

A lack of homogeneity in the distribution of heat in the furnace will lead to certain tubes becoming hotter than others, which is why the temperature profiles of the tubes are critical data both in the design and during operation of the furnace. The temperature profiles of the tubes—referred to as skin temperature or TST (standing for tube skin temperature) or TWT (standing for tube wall temperature) or simply tube temperature—provide information that is key to searching for a compromise between performance and durability; a good compromise is actually essential.

During operations, the performance of the furnace is limited by the temperature of the hottest tube (also known as maximum tube temperature, MTT); this temperature must not be greater than the MOT. At the same time, the performance of the process, i.e. the productivity or the efficiency of the reforming, is dependent on the average of the heat flows transmitted to the tubes and the temperatures thereof. This therefore means that the smaller the difference between the temperature of the hottest tube (MTT) and the temperature of the coldest tube, the better the performance of the furnace.

A consequence that is inherent to the design constraints of the reforming furnace is the lack of homogeneity in the transfer of heat between the rows of tubes within the furnace. One reason in particular is the difference between the momentums generated by the discharge of the combustion products, between the rows of outer and inner burners. Specifically, since the outer burners have to provide heat only to tubes situated on the same side, they are operated at a lower heating power than the inner burners—which, for their part, heat double the amount of tubes, distributed on either side—, that is to say generally between 50% and 80% of the heating rate of the inner burners. This difference in the heating rate, and thus in the mass flow rate, therefore implies that the combustion products discharged by the outer burners have a lower momentum than those of the inner burners. The flames of the outer burners are consequently deflected towards the middle of the furnace, rendering it difficult to balance the thermal power between the rows of tubes.

A feature common to all the proposed solutions to the problem of deflection of the flames is the need for major modifications in relation to the burners or in relation to the distribution manifolds for the combustion products of the burners, rendering these solutions difficult to apply to existing units. In particular, modifications at the burners themselves are difficult to implement, notably for a pre-existing furnace.

It is therefore desirable to propose, for a pre-existing furnace, a solution which makes it possible to avoid a deflection phenomenon of a burner flame and thus to control the homogeneity of the transfer of heat to the endothermic reaction.

It is in particular desirable to be able to have a furnace which ensures a more uniform transfer of heat between the multiple rows of reforming tubes, thus allowing a gain in efficiency at the installation and adjustment of the quantity of heat transferred to the row of outer tubes, such that said quantity of heat corresponds to the quantity received by the rows of inner tubes.

SUMMARY

A subject of the invention is therefore a furnace for implementing an endothermic process, comprising:

- a combustion chamber delimited by a wall,
- at least one tubular reactor positioned in the combustion chamber,
- at least one burner arranged in the combustion chamber so as to supply the tubular reactor with the heat required for the endothermic process,
- the burner comprising at least one nozzle for discharging a flame, the nozzle being oriented along an axis of the nozzle, characterized in that the chamber has, over at least part of an inner surface of the wall, a convex inner profile curved in a direction of the axis of the nozzle, the profile being adjacent to said burner and facing the axis of the nozzle.

The flow of fluid constituting the flame (or jet) in contact with the inner profile will tend to follow the curvature of the profile rather than continuing to travel in a straight line. The phenomenon of deflection of the flames of the outer burners towards the middle of the furnace is thus compensated and the heat is transferred more uniformly between the tubes.

The profile is in particular considered in a section plane of the chamber that is coincident with the axis of the nozzle.

According to one embodiment, the nozzle is oriented along a longitudinal axis of the nozzle.

According to one embodiment, the nozzle is configured to project the combustion gases into the combustion chamber in the direction of the axis of the nozzle.

According to one embodiment:

- the axis of the nozzle is not secant with the inner profile,
- a distance between a tangent to the inner profile, parallel to the axis of the nozzle, and the axis of the nozzle is a distance P,
- an inner dimension of the nozzle at the discharge end of said nozzle, in a direction in which the distance P is measured, is a dimension D,
- a ratio P/D being between 0 and 2.

Preferably, the ratio P/D is between 0 and 1.15. In particular, the distance P between the tangent and the axis of the nozzle is between 0 and 0.6 m.

According to an alternative embodiment, the axis of the nozzle is secant with the inner profile and the ratio P/D is between 0 and 0.25. Preferably, the ratio P/D is between 0 and 0.25. In particular, the distance P between the tangent and the axis of the nozzle is between 0 and 0.15 m.

According to one embodiment, starting from a point of the tangent touching the inner profile, the inner profile extends over a length L along the tangent, the inner profile having, inside the chamber, a thickness R, a ratio R/L being less than 1.1; preferably less than or equal to 1, preferably less than or equal to 0.4; preferably less than or equal to 0.3.

According to one embodiment:

- a distance measured along the axis of the nozzle, between that point of the tangent which touches the inner profile and a top of the nozzle, is a distance H,
- a distance I measured along the axis of the nozzle, between a top of the nozzle and an inner surface of the wall furthest away from the top of the nozzle, is a distance I,
- a ratio H/I being less than 1/2, preferably less than 1/3, preferably less than 1/4.

The distance H is notably less than 6 metres, preferably is less than 2.5 metres.

According to one embodiment:

- a plurality of tubular reactors are positioned in the combustion chamber,
- a plurality of burners are arranged in the combustion chamber in order to supply the tubular reactors with the heat required for the endothermic process,
- the tubular reactors extend longitudinally between a first inner surface of the wall and a second inner surface of the wall, said second inner surface being opposite to the first,
- the tubular reactors are arranged in rows and the burners are mounted on at least one of the first and second inner surfaces, burners, referred to as inner burners, being disposed between two rows of tubular reactors, and burners, referred to as outer burners, being disposed between a row of tubular reactors and a lateral inner surface of the wall, the lateral inner surface connecting the first inner surface and the second inner surface,
- each of the outer burners comprising at least one nozzle for discharging a flame, the nozzle being oriented along an axis of the nozzle,
- the chamber has, over at least part of the lateral inner surface, a convex inner profile curved in a direction of the axis of the nozzle of each of the outer burners, the profile being adjacent to each of said outer burners and facing the axis of the nozzle of each of the outer burners.

According to one embodiment, the nozzle of each outer burner is oriented along a longitudinal axis of said nozzle.

According to one embodiment, the nozzle of each outer burner is configured to project the combustion gases into the combustion chamber in the direction of the axis of said nozzle.

According to one embodiment, the inner profile comprises a protrusion which extends continuously over the lateral inner surface, the protrusion being adjacent to a plurality of outer burners, the protrusion facing the axis of the nozzle of each of the outer burners from among this plurality of outer burners.

According to an alternative embodiment, the inner profile comprises a plurality of protrusions, each of said protrusions being adjacent to an outer burner, each of the protrusions facing the axis of the nozzle of the outer burner to which it is adjacent.

According to one embodiment, for at least some or each of the outer burners:

- the axis of the nozzle is not secant with the inner profile,
- a distance between a tangent to the inner profile, parallel to the axis of the nozzle, and the axis of the nozzle is a distance P,
- an inner dimension of the nozzle at the discharge end of said nozzle, in a direction in which the distance P is measured, is a dimension D,
- a ratio P/D being between 0 and 2.

Preferably, the ratio P/D is between 0 and 1.15. In particular, the distance P between the tangent and the axis of the nozzle is between 0 and 0.6 m.

According to one embodiment, for at least some or each of the outer burners, the axis of the nozzle is secant with the inner profile and the ratio D/P is between 0 and 0.5. Preferably, the ratio D/P is between 0 and 0.25. In particular, the distance P between the tangent and the axis of the nozzle is between 0 and 0.15 m.

According to one embodiment, for each of the outer burners, starting from a point of the tangent touching the inner profile, the inner profile extends over a length L along the tangent, the inner profile having, inside the chamber, a thickness R, a ratio R/L being less than 1.1, preferably less than or equal to 1, preferably less than or equal to 0.4, preferably less than or equal to 0.3.

According to one embodiment, for each of the outer burners:

the outer burners are mounted on the first surface, a distance measured along the axis of the nozzle of each of the outer burners, between that point of the tangent which touches the inner profile and a top of the nozzle, is a distance H, a distance measured along the axis of the nozzle of each of the outer burners, between a top of the nozzle and the second surface, is a distance I, a ratio H/I being less than 1/2, preferably less than 1/3, preferably less than 1/4.

The distance H is notably less than 6 metres, preferably is less than 2.5 metres.

According to one embodiment, the outer burners are configured to operate at a power between 45 and 55% of that of the inner burners.

A further subject of the invention is a method for revamping a furnace for implementing an endothermic process, the furnace comprising:

a combustion chamber delimited by a wall, at least one tubular reactor positioned in the combustion chamber, at least one burner arranged in the combustion chamber so as to supply the tubular reactor with the heat required for the endothermic process, the burner comprising at least one nozzle for discharging a flame, the nozzle being oriented along an axis of the nozzle, the method comprising a step of modifying a profile of at least part of an inner surface of the wall such that the profile is convex and curved in a direction of the axis of the nozzle, the profile being adjacent to said burner and facing the axis of the nozzle.

According to one embodiment, the nozzle is oriented along a longitudinal axis of the nozzle.

According to one embodiment, the nozzle is configured to project the combustion gases into the combustion chamber in the direction of the axis of the nozzle.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
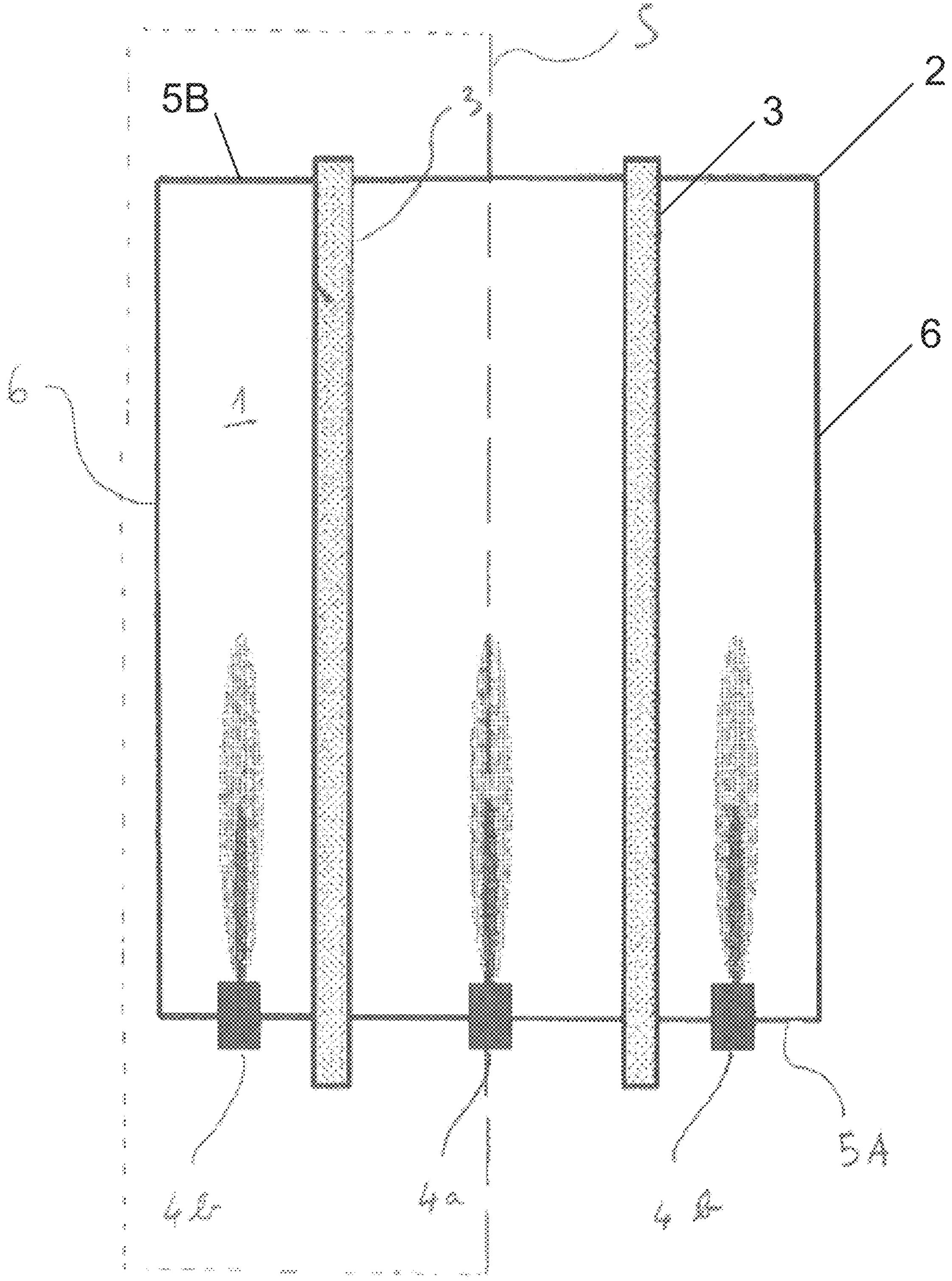
FIG. 1 shows the configuration of a furnace for implementing an endothermic process according to the prior art.

A furnace according to the prior art for implementing an endothermic process is schematically shown in FIG. 1.

The furnace comprises a combustion chamber 1 (or firebox). The combustion chamber 1 is delimited by a wall 2. From the viewpoint of the inside of the combustion chamber 1, there is at least one inner surface 5A; 5B; 6 which delimits the interior space of the combustion chamber 1.

Tubular reactors or tubes 3 are arranged in the combustion chamber 1 and extend longitudinally between a first inner surface 5A of the wall 2 and a second inner surface 5B of the wall 2, said second inner surface being opposite to the first inner surface 5A. In the embodiment shown, the tubular reactors 3 extend vertically (along a vertical axis). The tubes 3 are designed to implement an endothermic reaction and contain a catalyst for converting a feed gas.

Burners 4*a*; 4*b* are arranged so as to supply the tubular reactors 3 with the heat required for the endothermic reaction. The burners 4*a*; 4*b* comprise a nozzle oriented along a longitudinal axis of the nozzle, which may or may not be the vertical axis. The nozzle is configured to project the combustion gases into the combustion chamber 1 in the direction of the longitudinal axis. The nozzles of the burners 4*a*; 4*b* may be oriented along different axes or in different directions with respect one another.

In the embodiment in FIG. 1, the furnace is a vertically heated furnace and the burners 4*a*; 4*b* are mounted in the bottom of the combustion chamber 1 (that is to say the lower inner surface 5A or constituting the floor of the combustion chamber 1).

Reference is then made to bottom-fired, up-fired or floor-fired operation. In this embodiment, the combustion chamber 1 has a rectangular parallelepipedal shape. However, the invention also covers configurations in which the burners are mounted in the crown of the combustion chamber 1 (that is to say the upper inner surface 5B or constituting the roof of the combustion chamber 1). Reference is then made to top-fired, down-fired or roof-fired operation.

Burners 4*a*, referred to as inner burners, are disposed between two rows of tubes 3. In other words, rows of tubes 3 are disposed on either side of an inner burner 4*a*. Burners 4*b*, referred to as outer burners, are disposed between a row of tubes 3 and a lateral inner surface 6 of the chamber, said lateral inner surface connecting the crown to the bottom of the chamber. In other words, the lateral inner surface 6 is disposed on one side of an outer burner 4*b* and a row of tubes 3 is disposed on the other side of said outer burner 4*b*.

Figure 2:
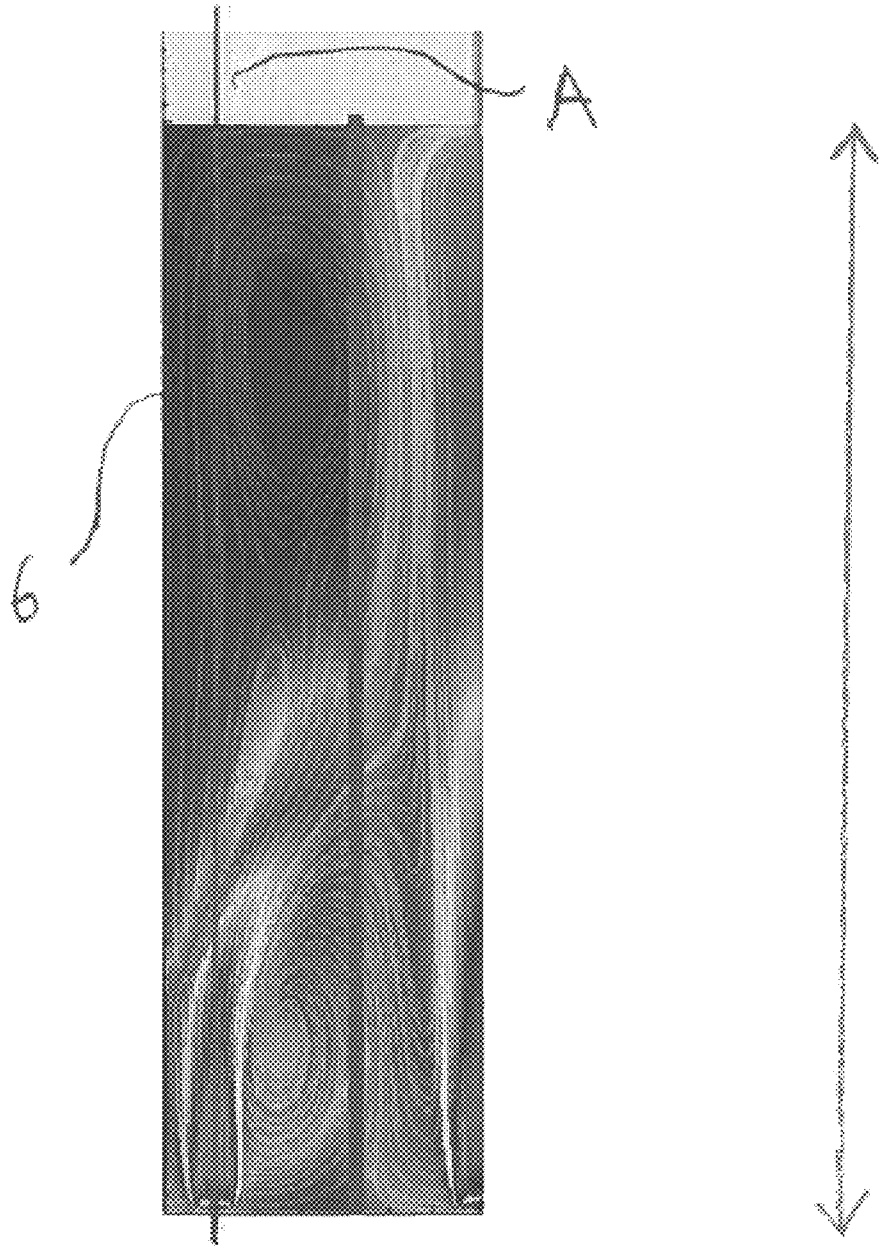
FIG. 2 is a view of one of the burners of a furnace in a configuration according to the prior art.

For the sake of simplicity, in FIGS. 2, 3, 4 and 5, the flame of a single outer burner 4*b* is shown in a configuration according to the prior art for FIG. 2 and according to the invention for the following figures. These views correspond to the zone that is delimited in dashed lines in FIG. 1, encompassing half the combustion chamber starting from the axis of symmetry S. In these embodiments, the burners 4*a*; 4*b* are mounted in the hearth.

The outer burners 4*b* only heat one row of tubes 3 instead of two like the inner burners 4*a*. The outer burners 4*b* are therefore typically configured to operate at a power between 45 and 55% of that of the inner burners 4*a*.

The burner 4*b* comprises a nozzle for discharging a flame emitted by the burner 4*b*. The nozzle is oriented along an axis embodied by the straight line A for FIG. 2, by the straight line A' for FIG. 3 and by the straight line A" for FIGS. 4 and 5. The axis along which a nozzle is oriented passes through the centre of said nozzle. In the configuration according to the prior art, a phenomenon of deflection of the flame towards the middle of the furnace occurs. It is specifically visible in FIG. 2 that the upper part of the flame deflects from the axis A of the nozzle.

Figure 3:
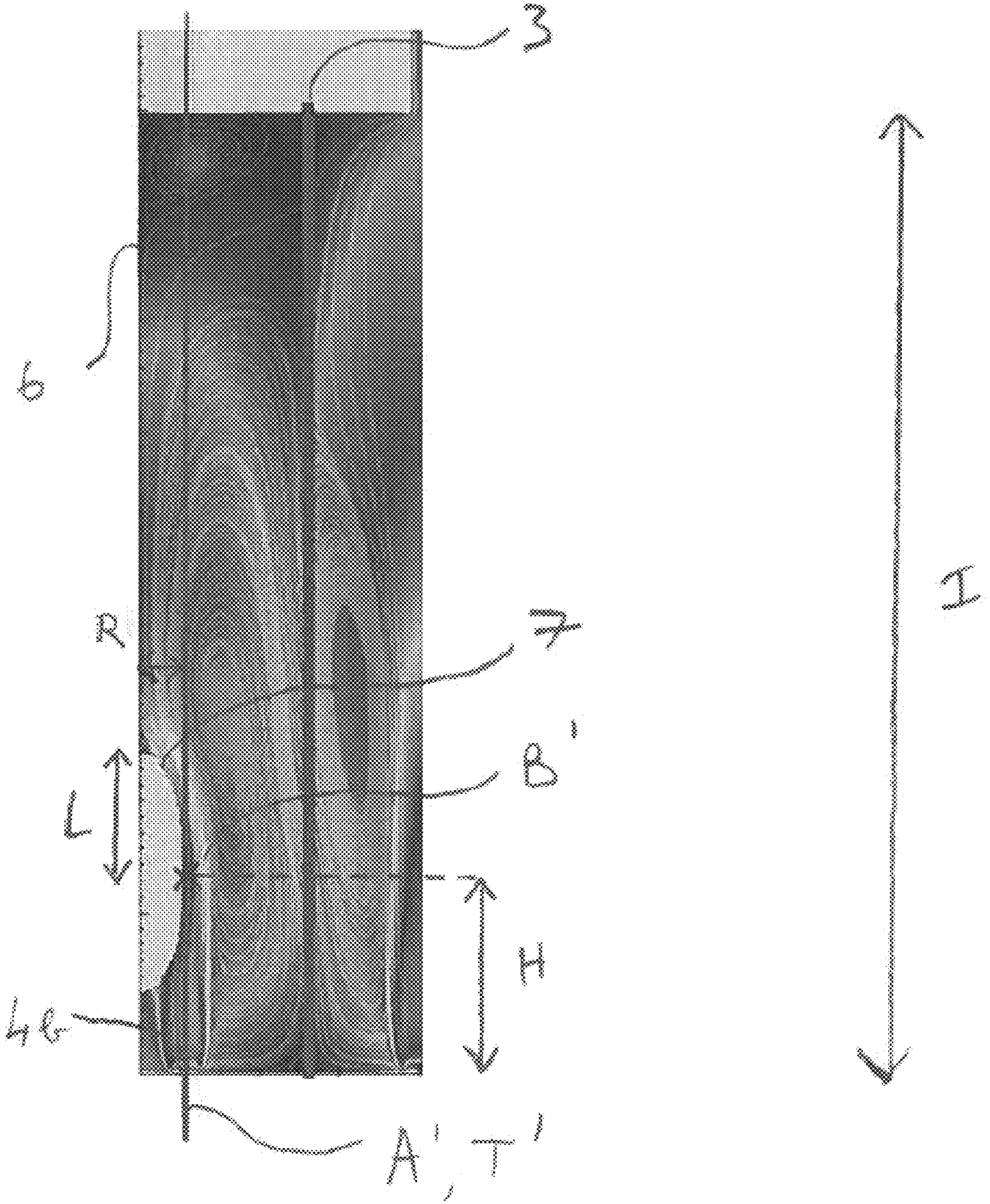
FIG. 3 is a view of one of the burners of a furnace in a configuration according to the invention.
Figure 4:
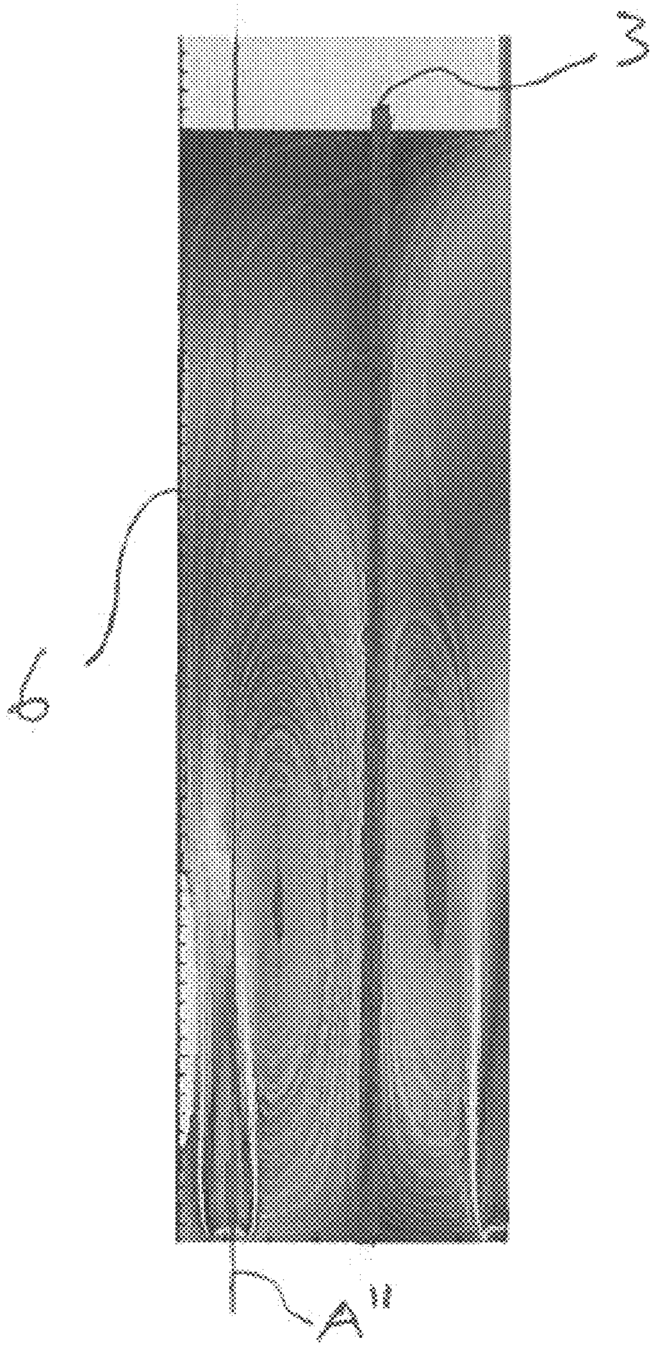
FIG. 4 is a view of one of the burners of the furnace according to the invention with alternative dimensioning to that of FIG. 3.
Figure 5:
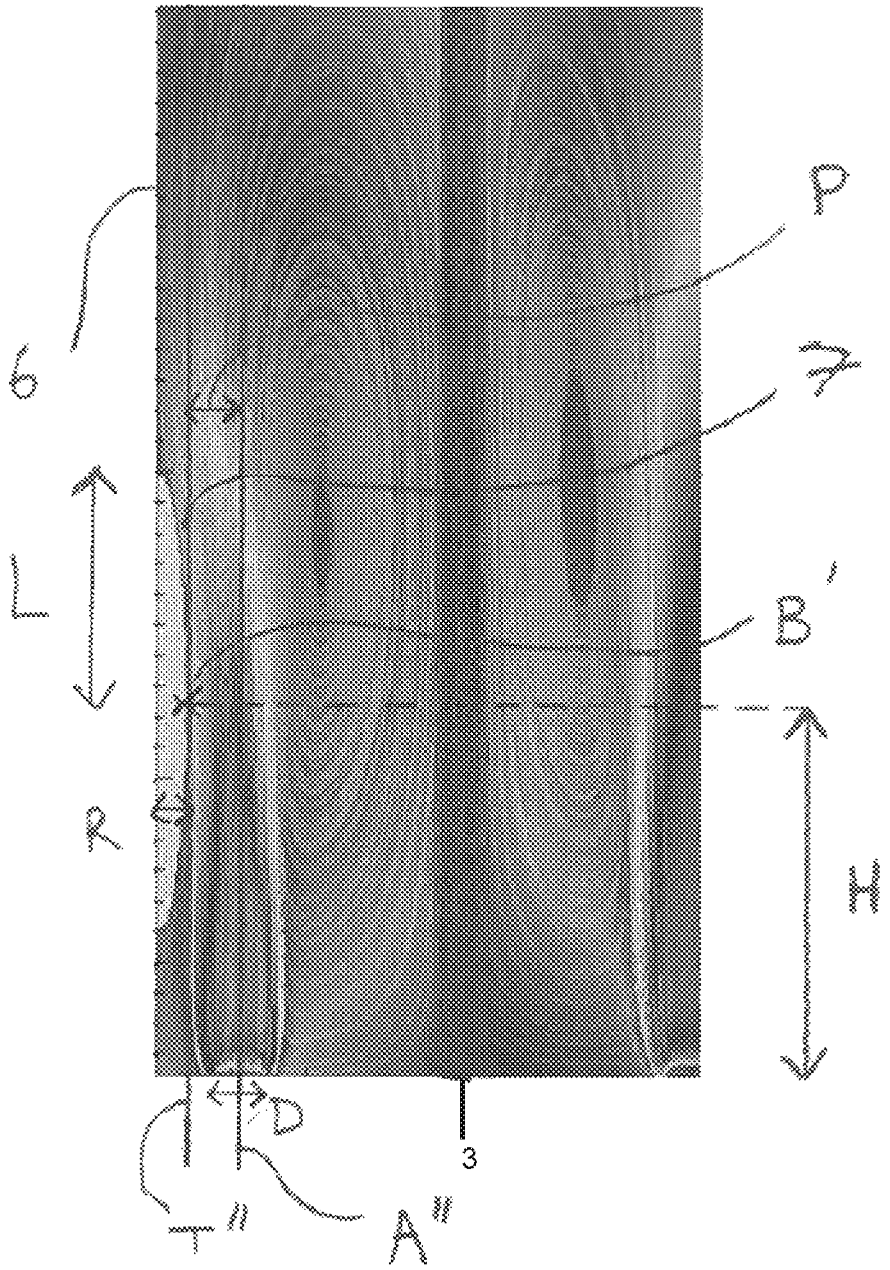
FIG. 5 is an enlarged view of FIG. 4.

In the configuration according to FIGS. 3, 4 and 5, the chamber has, over a lateral inner surface 6 connecting the crown and the hearth, a convex inner profile 7. The profile 7 is curved in a direction of the axis of the nozzle. The inner profile 7 is adjacent to the outer burner and faces the axis A'; A" of the nozzle of each of the outer burners 4*b*. The inner space of the chamber 1 as delimited by the wall 2 is thus profiled in a convex manner from the viewpoint of the inside of the chamber and curved over part of an inner surface of the wall 2. The profile 7 is considered in a section plane of the chamber 1 that is coincident with the axis A'; A" of the nozzle, the plane being orthogonal to the inner surface of the wall 2, over an inner surface of the wall 2 (in this case the lateral inner surface 6), the inner surface being profiled.

The inner profile 7 comprises, for example, at least one protrusion which extends continuously over the lateral inner surface 6, the protrusion being adjacent to a plurality of outer burners 4*b* (or even all of the outer burners 4*b*), the protrusion facing the axis A'; A" of the nozzle of each of the outer burners 4*b* from among this plurality of outer burners 4*b*.

In an alternative embodiment, the inner profile 7 comprises a plurality of protrusions, each of said protrusions being adjacent to one of the outer burners 4*b*, each of the protrusions facing the axis A'; A" of the nozzle of the outer burner 4*b* to which it is adjacent.

"Convex profile" should be understood to mean that a segment connecting any two points of a surface of the profile 7 (the profiled surface) extends exclusively outside the interior space of the combustion chamber 1. The profile is therefore convex from the viewpoint of the combustion chamber 1 or curved towards the inside of the chamber 1.

"Profile adjacent to at least one burner" should be understood to mean that the burner or burners 4*b* are in the immediate vicinity of the profile 7, such that no element of the furnace extends or acts as a barrier between the flame emitted by said burner 4*b* and the profile. In other words, the axis of the nozzle directly faces the profiled surface. The profile is disposed directly facing the outer burners in the configuration of FIGS. 3 and 4.

In FIG. 3, it is possible to define a tangent T' to the profiled surface, tangent T' being parallel to the axis A' of the nozzle. In a configuration in which the nozzle is oriented vertically and the combustion chamber 1 has a rectangular parallelepipedal shape, the tangent is parallel to the lateral inner surface 6. The inner profile 7 has a non-zero curvature with respect to the tangent T' which acts as frame of reference for the curvature. The tangent T' touches the profiled surface at a point B', without passing through said surface. The profiled surface and the tangent T' thus form a zero angle at point B'. Travelling along the profiled surface in the direction of the axis A', the profiled surface moves away locally from the tangent T' (and from the axis A'), thus characterizing the curvature in the direction of the axis A'. The curvature is considered a projection of the axis A' or of the tangent T' on the profiled surface, said projection forming an arc along the profiled surface. A curved surface is a surface whose tangent changes direction when the surface is travelled along, without the surface forming any edges along the path in question.

The inner profile 7 is arranged adjacent to the outer burners 4*b* such that the flame emitted by an outer burner 4*b* skims over the profiled surface: there is a jet line of the flame which reaches the profiled surface tangentially and flows directly along the profile 7. The flow of fluid constituting the flame (or jet) in contact with the profile 7 will tend to follow the curvature of the profile 7 (Coanda effect) rather than continuing to travel in a straight line or deflecting towards the middle of the furnace as in the prior art. The phenomenon of deflection of the flames of the outer burners towards the middle of the furnace is thus compensated and the heat is transferred more uniformly between the tubes 3.

The curvature of the inner profile 7 extends from the point B' over a length L along the tangent. The length is measured along the tangent T', between the point B' and, for example, a point at which the profile 7 forms an edge, that is to say stops being curved, or up to a limit of the convex inner profile 7 (at a location at which the inner surface stops being convex). Along the considered curvature of the profile 7, the latter moves away from the tangent T' by a distance R up to the end of the curvature, this defining the thickness of the inner profile. The distance R thus considered corresponds to the maximum spacing, with respect to the tangent T', of the profile 7 along the curvature thereof. The distance is measured along a direction perpendicular to the tangent T' and to the axis A'. FIG. 3 shows an embodiment of the invention in which a ratio of R/L is equal to 0.37.

FIG. 3 shows a configuration of the furnace in which the burner 4*b* and the inner profile 7 are disposed with respect to one another in the combustion chamber 1 in such a way that the axis A' of the nozzle does not intersect or pass through the profiled surface. The axis A' is then said to not be secant with the inner profile 7 (in other words, the axis A' does not pass through the profiled surface). A distance P between the tangent T' and the axis A' is equal to zero in the embodiments in FIG. 3. In other words, the tangent T' and the axis A' are coincident. It is possible to define an inner dimension D of the nozzle in the direction in which the distance P is measured. The dimension D is considered at the discharge end of the nozzle, via which the combustion gases (the flame) are projected or discharged. The nozzle defines an inner channel for circulating and projecting the combustion gases, and D corresponds to a maximum inner dimension of the nozzle, in the direction considered, in this channel and at the discharge end of the nozzle. D serves as a reference dimension. When the nozzle is of circular shape, the dimension D corresponds to a diameter of the nozzle.

The description in the preceding paragraphs applies, by analogy, to the embodiment in FIGS. 4 and 5, with a tangent T" parallel to the axis A" and a point B" at which the tangent T" touches the profiled surface. In this embodiment, a ratio of R/L is equal to 0.22. FIG. 5 is a magnified view of FIG. 4 in that zone of the profile 7 in which the dimensions are more visible. Furthermore, a distance P between the tangent T" and the axis A" is non-zero and equal to approximately one times the dimension D (P/D=1). The distance P is notably approximately equal to 0.6 metres, as is the dimension D.

In the embodiment in FIG. 3, the burner 4*b* and the profile 7 are disposed with respect to one another in such a way that the profile 7 is partially in line with the burner 4*b*, certain jet lines of a flame emitted by the burner 4*b* being able to impinge on the profile 7 in a non-tangential manner.

In another arrangement of the burner 4*b* and of the profile 7 that is not shown, the axis A' is secant with the profile 7. That is to say that the axis A' intersects or passes through the profiled surface at two points due to the convexity of the profile 7. A ratio P/D is notably between 0 and 0.5. The distance P is notably between 0 and 0.15 metres. Since the flame emitted is typically wider than the nozzle in terms of its dimension D, the profile 7 can thus be disposed in alignment with the nozzle over the majority, or indeed virtually the entirety, of the dimension D.

The targeted distances between the tangent T'; T" and the axis A'; A" in the context of the invention are expressed in absolute value.

Preferably, a distance H measured along a direction of the axis A'; A" of the nozzle, between the point B'; B" and a top of the nozzle, corresponds to at least half a distance I measured along the direction of the axis A'; A" of the nozzle, between a top of the nozzle and the crown of the furnace, preferably to at least a third of the distance I, preferably to at least a quarter of the distance I, preferably to at least an eighth of the distance I. In other words, the point B'; B" is at a height H with respect to the top of the nozzle. The distance H is notably less than or equal to 6 metres. The distance H measured along the axis A'; A" therefore corresponds to the distance between the projection of the point B on the axis A'; A" and the top of the nozzle.

The point B'; B" is for example situated at a height H approximately equal to 6 metres with respect to the burners 4*b*, and the distance I is approximately equal to 24 metres.

The configuration according to the invention, in this case shown for a single outer burner 4*b*, may be extrapolated to a plurality of outer burners 4*b* of the furnace, or indeed all of the outer burners 4*b*.

The endothermic process is for example a reforming process, and the tubular reactors 3 are reforming tubes. In this case, the furnace is a reforming furnace, also called a reformer. Mention may be made by way of example of a steam methane reforming process.

The invention also relates to a method for revamping a furnace according to the prior art, the method comprising a step of modifying an inner profile 7 of at least part of an inner surface 6 of the wall 2 such that the profile 7 is convex and curved in a direction of the axis A'; A" of the nozzle of at least one outer burner, the profile 7 being adjacent to said one outer burner 4*b* and facing the axis A'; A".

The invention thus proposes a flexible solution for adapting an existing furnace in order to combat a deflection phenomenon of a flame of a burner, said solution requiring no modification of the burner itself.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A furnace for implementing an endothermic process, comprising:

a combustion chamber delimited by a wall, at least one tubular reactor positioned in the combustion chamber, at least one burner arranged in the combustion chamber configured to supply the tubular reactor with the heat required for the endothermic process, the burner comprising at least one nozzle for discharging a flame, the nozzle being oriented along an axis of the combustion chamber, wherein the chamber has, over at least part of an inner surface of the wall, a convex inner profile curved in a direction of the axis of the nozzle, the profile being adjacent to said burner and facing the axis, wherein the convex inner profile protrudes over the inner surface of the wall, and wherein the inner profile extends over a length L along a tangent to the inner profile, parallel to the axis of the nozzle, starting from a point of the tangent touching the inner profile, the inner profile having, inside the chamber, a thickness R, a ratio R/L being less than 1.1.

2. The furnace according to claim 1, wherein:

the axis of the nozzle is not secant with the inner profile, a distance between a tangent to the inner profile, parallel to the axis of the nozzle, and the axis of the nozzle is a distance P, an inner dimension of the nozzle at the discharge end of said nozzle, in a direction in which the distance P is measured, is a dimension D, and a ratio P/D is between 0 and 2.

3. The furnace according to claim 1, wherein:

the axis of the nozzle is secant with the inner profile, a distance between a tangent to the inner profile, parallel to the axis of the nozzle, and the axis of the nozzle is a distance P, an inner dimension of the nozzle at the discharge end of said nozzle, in a direction in which the distance P is measured, is a dimension D, and a ratio P/D is between 0 and 0.5.

4. The furnace according to claim 1, wherein:

a distance measured along the axis of the nozzle, between that point of the tangent which touches the inner profile and a top of the nozzle, is a distance H, a distance I measured along the axis of the nozzle, between a top of the nozzle and an inner surface of the wall furthest away from the top of the nozzle, is a distance I, a ratio H/I being less than 1/2.

* * * * *